2,787,529
Patented Apr. 2, 1957

2,787,529

METHOD FOR DETERMINING BORON FLUORIDE ETHER COMPLEX IN A COMPOSITION

Walter A. Winsten, Forest Hills, and Isidor Kirshenbaum, New York, N. Y., assignors to the United States of America as represented by the United States Atomic Energy Commission No Drawing. Application July 16, 1945,
Serial No. 605,448

6 Claims. (Cl. 23—230)

The present invention relates to an analytical method and more particularly to a method for determining the quantity of a boron fluoride ether complex in a composition containing the same.

An object of the invention is to provide a method for determining the quantity of a complex of boron fluoride and a volatile ether in a composition containing the same.

Other objects of the invention will be in part obvious and in part pointed out hereinafter.

Boron trifluoride combines with volatile ethers, particularly dimethyl and diethyl ethers to form relatively stable complexes of the type $R_2O.BF_3$ where R is the alkyl radical. These complexes may be used for various purposes. For example, they can be used as carriers of boron trifluoride. A specific use of the complexes is in the process for separating boron isotopes disclosed in the patent application of Crist et al., Serial Number 543,502, filed July 4, 1944. In accordance with the process of that application the boron isotopes are separated by establishing a countercurrent flow of the ether complex in liquid phase and in vapor phase to concentrate the heavier isotope in the vapor phase and the lighter isotope in the liquid phase. During this process some by-products, such as alkyl borate-boron trifluoride complexes, are formed, thus reducing the purity of the recoverable ether complex. The present invention provides a simple and rapid method for analyzing a composition to determine the quantity of boron trifluoride-ether complex which it contains. The invention is not restricted to the use of compositions obtained in the isotope separation process mentioned but is equally applicable to other compositions in which the ether complexes may be found.

In accordance with the invention it has been found that the ether complexes can be decomposed by a rapid and easily controlled process and the volatile ether component of the complex removed from the mixture. The amount of ether thus liberated can be readily determined, as by weight difference, and from this figure the amount of the complex originally present in the composition is easily calculated.

Decomposition of the ether complexes depends on the action of water which liberates the ether and forms a series of hydrates and hydrolysis products of the boron trifluoride which are not volatile under the conditions of the method. In addition to the action of the water on the complex the invention relies on the action of water-soluble salts, such as alkali metal or alkaline earth metal halides, sulfates, nitrates or phosphates. The use of these salts in conjunction with the water increases the rate at which the ether is liberated and also results in the salting-out of the ether from the mixture of water and other components of the composition. The liberation of ether can be controlled by suitable selection of temperature, pressure, and rate of addition of the salt to permit gentle evolution of the ether as a gas while avoiding spattering of the non-volatile components.

The method of the invention permits the use of a small sample of the composition to be analyzed and under preferred operating conditions the analysis occupies a period of one-half hour or less.

The relative quantities of the composition, water, and water-soluble salts to be used may be varied within a wide range. For example, as little as about 16% of water based on the weight of composition being analyzed can be used, but for rapid liberation of the ether it is preferable to employ a quantity of water at least equal to and up to several times, the weight of the sample of the complex. The amount of the salt added should be sufficient to form a saturated solution in order to achieve the maximum salting-out effect. It will generally be preferable to add a small excess of salt in order to insure the formation of a saturated solution. Both the reaction with water and the reaction with the salt are exothermic and therefore the water is preferably added to the composition a short time before the salt so as to avoid violent ebullition of the ether which tends to spatter the mixture resulting in the loss of some non-volatile material. It will be understood however that by exercising proper precautions, such as cooling to reduce the violence of the ether liberation, or the use of suitable apparatus to avoid loss of material through spattering, the order of addition of water and salt can be varied and the salt added either before the water or simultaneously with the water.

In the case of the dimethyl ether-boron trifluoride complex the addition of water at room temperature causes a moderate evolution of the ether. The gradual addition of the salt to this mixture produces a more rapid rate of ether evolution and liberates most of the ether from the mixture. If it is desired to introduce the salt more rapidly the mixture of water and ether may be cooled to reduce the violence of the ether liberation.

In the case of the diethyl ether-boron trifluoride complex the same general considerations apply with the exception that it is desirable to allow the temperature of the mixture to rise moderately to compensate for the lower volatility of diethyl ether.

In order to calculate the quantity of the ether-boron trifluoride complex in a sample the operation referred to above can be carried out with a known weight of the sample and known weights of water and salt. The amount of ether liberated is then determined by weighing the final mixture and subtracting the final weight from the total weights of the sample and the materials added. It is necessary to make a correction in the quantity of ether indicated by the weight difference to compensate for the solubility of the ether in the mixture. This solubility is suitably determined by performing the analytical method on a sample of known ether complex content, using the same relative weights of sample, water and salt. The difference between the ether content as determined by said weight loss and the known ether content then provides the correction factor due to the solubility of the ether in the mixture.

The following is a specific example of the practice of the method of the invention.

Example

A 2 cc. sample of a composition containing an unknown quantity of dimethyl ether-boron trifluoride complex was run into a tared 6-inch test tube from a calibrated pipette. The weight of this sample was determined to be 2.4155 grams. Exactly 2 cc. of water were then added to the sample from another calibrated pipette. This amount of water weighed 1.9588 grams. The test tube and its contents were placed in an ice bath and stirred for about 10 minutes. At this time 3.5959 grams sodium fluoride were added and the stirring was continued until no more ether was liberated. The test tube was then removed from the ice bath, wiped dry and weighed. The weight of ether lost was 0.8981 gram. A reference run made on pure dimethyl ether-boron trifluoride complex with the same relative weights gave a correction factor of 0.0357 gram of ether as the solubility of dimethyl ether in the mixture employed. Adding the correction to the observed weight of ether lost gave a total ether content in the original composition of 0.9338 gram which corresponds to a weight of 2.3142 grams ether complex in the sample, or 96% ether complex content. The weight 2.3142 grams is obtained by multiplying the total ether content (0.9338 gram) by the ratio of the molecular weight of dimethyl ether-boron trifluoride complex (114 grams per mole) to the molecular weight of dimethyl ether (46 grams per mole). This ratio 114/46 is equal to 2.4783.

Instead of using the technique of cooling the mixture in an ice bath the analysis can be performed at room temperature by carefully adding the salt in small portions.

Since many embodiments might be made of the present invention and since many changes might be made in the embodiment described, it is to be understood that the foregoing description is to be interpreted as illustrative only and not in a limiting sense.

We claim:

1. The method for determining the quantity of a complex of boron trifluoride and a volatile ether in a composition containing the same, which comprises mixing the composition with water and a water-soluble mineral acid salt of a metal selected from the group consisting of alkali and alkaline earth metals to decompose the complex and liberate the ether, and measuring the quantity of ether liberated.

2. The method for determining the quantity of boron trifluoride-dimethyl ether complex in a composition containing the same, which comprises mixing the composition with water to decompose the complex, adding a water-soluble mineral acid salt of a metal selected from the group consisting of alkali and alkaline earth metals to the mixture to liberate the ether, and measuring the quantity of ether liberated.

3. The method for determining the quantity of a complex of boron trifluoride and a volatile ether in a composition containing the same, which comprises mixing the composition with water to decompose the complex, adding a water-soluble mineral acid salt of a metal selected from the group consisting of alkali and alkaline earth metals to the mixture to liberate ether from the water, and measuring the quantity of ether liberated.

4. The method for determining the quantity of a complex of boron trifluoride and a volatile ether in a composition containing the same, which comprises mixing a known weight of the composition with a known weight of water to decompose the complex, adding a known weight of a water-soluble mineral acid salt of a metal selected from the group consisting of alkali and alkaline earth metals to the mixture to liberate the ether therefrom, controlling the rate of evolution of the ether to avoid loss of non-volatile ingredients of the mixture, and measuring the weight of ether evolved.

5. The method for determining the quantity of a complex of boron trifluoride and a volatile ether in a composition containing the same, which comprises mixing a known weight of the composition with a known weight of water to decompose the complex, adding a known weight of sodium fluoride to the mixture to liberate the ether therefrom, controlling the rate of evolution of the ether to avoid loss of non-volatile ingredients of the mixture, and measuring the weight of ether evolved.

6. The method for determining the quantity of a complex of boron trifluoride and dimethyl ether in a composition containing the same, which comprises mixing a known weight of the composition with a known weight of water to decompose the complex, adding a known weight of sodium fluoride to the mixture, and measuring the weight of ether evolved.

References Cited in the file of this patent

UNITED STATES PATENTS

| 2,135,458 | Schultz | Nov. 1, 1938 |
| 2,135,460 | Loder | Nov. 1, 1938 |
| 2,377,396 | Axe | June 5, 1945 |

FOREIGN PATENTS

| 486,563 | Great Britain | June 7, 1938 |

OTHER REFERENCES

Gattermann, Practical Methods of Organic Chemistry, 3d ed., 1920, pages 49 and 50.

Karrer: Organic Chemistry (1938), page 105. Copy in Div. 59.

Brown et al.: J. Am. Chem. Soc., 64 (1942), 2557–63.